United States Patent [19]
Takemoto et al.

[11] Patent Number: 5,172,236
[45] Date of Patent: Dec. 15, 1992

[54] ELECTRONIC PAN-FOCUSING APPARATUS FOR PRODUCING FOCUSED IMAGES INDEPENDENT OF DEPTH OF FIELD AND TYPE OF LENS

[75] Inventors: Hiroshi Takemoto, Yokohama; Akira Takahashi, Kawasaki, both of Japan

[73] Assignee: Ricoh Company, Ltd., Tokyo, Japan

[21] Appl. No.: 569,962

[22] Filed: Aug. 20, 1990

[30] Foreign Application Priority Data

Aug. 23, 1989 [JP] Japan .................................. 1-217129

[51] Int. Cl.⁵ .............................................. H04N 5/232
[52] U.S. Cl. ..................................... 358/227; 354/402
[58] Field of Search ................ 358/227, 209; 354/402, 354/400, 404; 350/426

[56] References Cited

U.S. PATENT DOCUMENTS

| | | | |
|---|---|---|---|
| 4,484,806 | 11/1984 | Onishi et al. | 354/404 |
| 4,872,058 | 10/1989 | Bada et al. | 358/209 |
| 4,967,279 | 10/1990 | Murashima | 358/227 |
| 4,990,947 | 2/1991 | Komiya et al. | 354/402 |
| 4,998,126 | 3/1991 | Kazami | 354/400 |

OTHER PUBLICATIONS

Proceedings of the IEEE, Jan., 1969, "Hadamard Transform Image Coding", pp. 178–188; Pratt et al.
"Digital Image Processing"; 1978; Pratt; pp. 232–256.
IEEE Transactions on Computers, Sep., 1976; "First Fourier Transform"; 3 pages.
IEEE Transactions on Computers, vol. C-24, No. 9, Sep., 1975; "Image Data Processing by Hadamard-Haar Transform", K. R. Rao et al., pp. 888–896.
IEEE Transactions on Computers, Jan. 1974.

Primary Examiner—James J. Groody
Assistant Examiner—Glenton B. Burgess
Attorney, Agent, or Firm—Oblon, Spivak, McClelland, Maier & Neustadt

[57] ABSTRACT

An electronic pan-focusing apparatus for a camera including a image pickup portion which is arranged to receive one or plural optical images from a photographic lens of the camera. The image pickup portion is adapted to divide each of the images into a plurality of regions in horizontal and vertical directions and to pickup image data and high-frequency component data from each of the regions. An image storage portion is provided for storing the image data and the high-frequency component data of each of the regions fed from the pickup means at every image. An arithmetic portion is adapted, when the data of the plural images are stored in the image storage means, to mutually compare in magnitude the high-frequency data of the regions which take the same position in the respective images and thereby to make a composite image from the plural images by selecting one of the regions having a largest high-frequency component data in magnitude at every position. The arithmetic portion is also adapted to output the image data of the regions of the composite image.

5 Claims, 2 Drawing Sheets

MOUNTAINS ARE IN AN IN-FOCUS STATE

PERSON IS IN AN IN-FOCUS STATE

FLOWERS ARE IN AN IN-FOCUS STATE

ELECTRONIC PAN-FOCUSING APPARATUS FOR PRODUCING FOCUSED IMAGES INDEPENDENT OF DEPTH OF FIELD AND TYPE OF LENS

BACKGROUND OF THE INVENTION

The present invention relates to an electronic pan-focusing apparatus for use in a camera such as optical camera, video camera, still video camera or the like.

Various cameras having therein an automatic focusing unit for performing an automatic focusing operation have been known. When such cameras are used to make an image including an image portion of a main object as well as an image portion of a background, the automatic focusing operation is performed ordinarily to the main object, so it is difficult to make an image in which both the image portion of the main object and the image portion of the background are in focus.

In order to make an image in which any image portions are in focus in irrespective to a main object or a background, it is considered to reduce an aperture-stop of the camera lens so as to increase the depth of field, as well as to use a photographic lens having a short focal distance.

In the case that the camera having a photographic lens having a short focal distance is used to make an image for displaying or introducing, for example, relatively small goods, there occurs a problem that the image, which may include not only an image portion of an object to be photographed but also image portion of something or other around the object is taken with the camera due to an inherent wide view-angle characteristic of the lens having a short focal distance. Further, since the depth of the field is closely related to a camera exposure, it may be often restricted to increase the depth of field in order to ensure a proper camera exposure.

It is therefore an object of the invention to provide an electronic pan-focusing apparatus for a camera, which makes it possible to make an image in which any image portions can be substantially in an in-focus state independent of a depth of field or a kind of lens even when the objects have different distances with respect to the camera.

Another object of the invention is to provide an electronic pan-focusing apparatus for a camera, which can make a composite image, in which any image portions can be substantially in an in-focus state, from plural images which have been taken with the camera.

The objects of the invention can be achieved by an electronic pan-focusing apparatus for a camera having a photographic lens, comprising: image pickup means arranged to receive one or plural optical images from the lens, the image pickup means being adapted to divide each of the images into a plurality of regions in horizontal and vertical directions and to pickup image data and high-frequency component data from each of the regions; storage means for storing the image data and the high-frequency component data of each of the regions fed from the pickup means at every image; and arithmetic means adapted, when the data of the plural images are stored in the storage means, to mutually compare in magnitude the high-frequency data of the regions which take the same position in the respective images and thereby to make a composite image from the plural images by selecting one of the regions having a largest high-frequency component data in magnitude at every position, the arithmetic means being also adapted to output the image data of the regions of the composite image.

According to the present invention, in the case that data of plural images are respectively stored in the storage means, a composite image comprised of the regions selected at every position is made from the plural images. When objects having different distance with respect to the camera are taken with the camera for making an image in the image pickup means, the photographic lens of the camera is adjusted to be in focus on a part of the objects. In this case, the more the part of the objects gets closer to an in-focus state, the more a high-frequency component signal of the image region having an image data of the part of the objects increases in magnitude. Accordingly, when plural optical images of substantially the same objects having different distances with respect to the camera are made by the camera, the photographic lens of the camera is adjusted to be in focus on different parts of the objects at every image to be made. Thereafter, the composite image is made from the plural images in such a manner that one of the regions of the plural images, which has a largest high-frequency component data in magnitude, is selected at every position of region. Accordingly, it is possible to obtain the composite image in which any image portions can be substantially in an in-focus state independent of to a depth of field or a kind of lens even when the objects have different distances with respect to the camera.

Preferably, the arithmetic means is further adapted to perform interpolation of the image data at boundaries of the respective adjacent regions of the composite image. In this case, the composite image can be obtained in the state that respective adjacent portions of the image are smoothly connected to each other.

Preferably, the arithmetic means is further adapted, when data of a single image only are stored in the storage means, to pickup the image data of the regions of the image from the storage means for outputting the same. Accordingly, the single image which has been taken with the camera can be obtained as it is.

The image data may be fed from the arithmetic means to a display portion of the camera. Further, the camera may be an optical camera, a video camera, or a still video camera.

Further objects, features and advantages of the present invention will become apparent from the following description of the preferred embodiments of the present invention as illustrated in the accompanying drawings.

DESCRIPTION OF THE PREFERRED EMBODIMENTS

Figure 1:
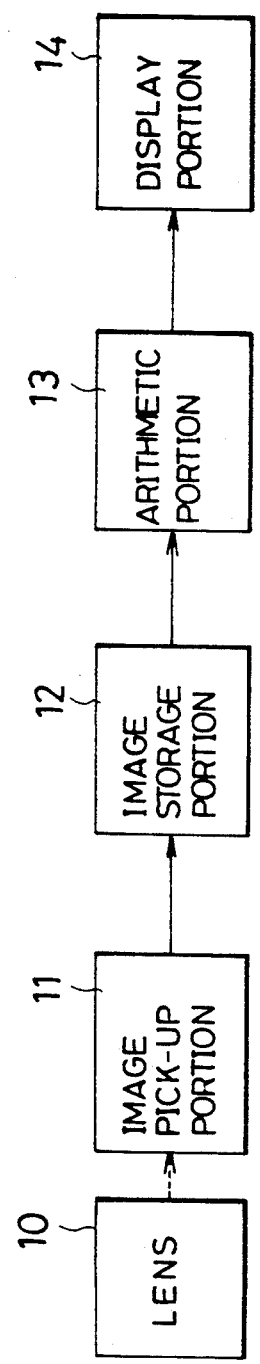
FIG. 1 is a block diagram for explaining the construction of one embodiment of an electronic pan-focusing apparatus according to the present invention.
Figure 2:
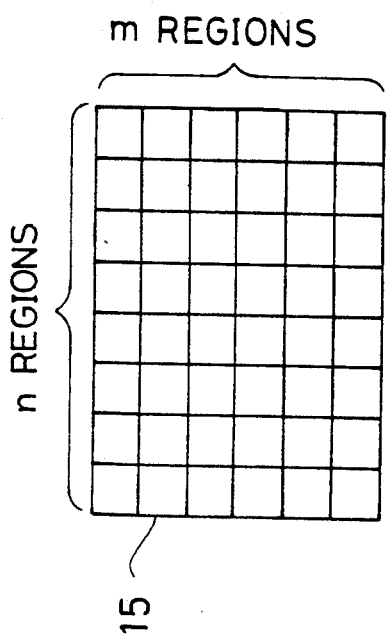
FIG. 2 is a view schematically illustrating division of the image formed in an image pickup means of the electronic pan-focusing apparatus shown in FIG. 1.

FIGS. 1 and 2 shows one embodiment of the electronic pan-focusing apparatus according to the present invention which may be applied to an optical camera, video camera, still video camera or the like.

Referring to FIG. 1, the electronic pan-focusing apparatus, comprises an image pickup portion 11, an image storing portion 12, and an arithmetic portion 13. The image pickup portion 11 is arranged to receive one or plural optical images from a photographic lens 10 of the camera. As shown in FIG. 2, the image pickup portion is also adapted to divide each of the optical images, which are successively formed within a predetermined rectangular range 15, into $n \times m$ regions in horizontal and vertical directions. The image pickup portion 11 may include a charge coupled device (CCD). A high-frequency component signal is generated from the optical image at every region, and the optical image is converted to an electric signal at every region in the image pickup portion 11. Thereafter, these signals are converted to digital data, respectively, and then fed to the image storage portion 12. The image data and the high-frequency component data made from each of the regions of the images are thus stored in the image storage portion 12 at every image. The storage portion 12 may include one or more memory devices such as RAM disk or memory card. The arithmetic portion 13 is adapted, when the data of the plural images are stored in the storage portion, to mutually compare in magnitude the high-frequency component data of the regions which take the same position in the respective images and thereby to make a composite image from the plural images by selecting one of the regions having a largest high-frequency component data in magnitude at every position. The arithmetic portion 13 is also adapted to output the image data of the regions of the composite image. The arithmetic portion 13 may include a microprocessor.

In the illustrated embodiment, the arithmetic portion is further adapted to perform interpolation of image data at boundaries of the respective adjacent regions of the composite image, and image data of the regions of the composite image is supplied to a display portion 14 of the camera to display the composite image in visible. The display portion 14 may include a liquid crystal device.

Explanation will now be made as to an operation of the above-described electronic pan-focusing apparatus with respect to FIGS. 3 to 5.

Figure 3:
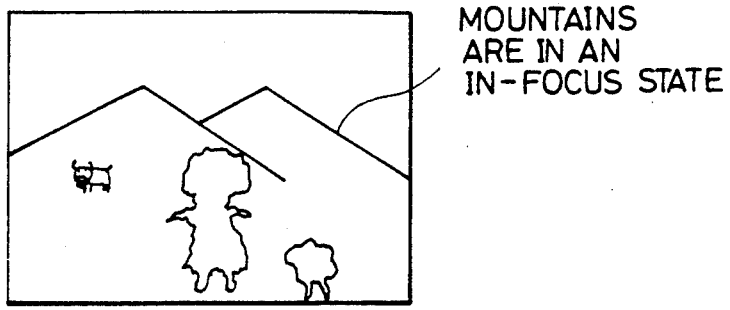
FIGS. 3 to 5 are views each for explaining an operation of the electronic pan-focusing apparatus shown in FIG. 1.
Figure 4:
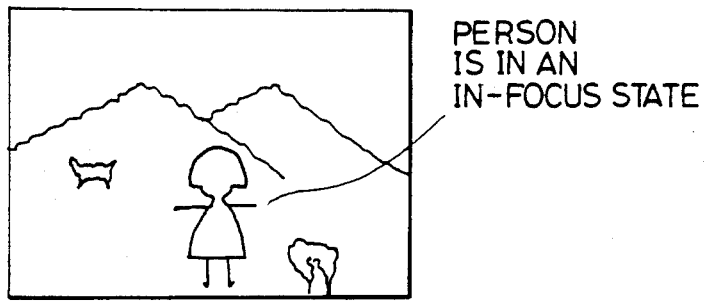
Figure 5:
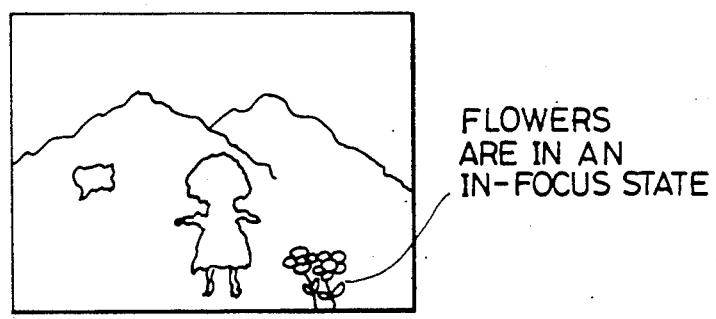

In the case that it is intended to take an image of objects including mountains as a background which has a long distance with respect to the camera, a person which has a middle distance with respect to the camera, and flowers which have a short distance with respect to the camera, a cameraman can take, for example, three optical images with the camera, as shown in FIGS. 3 to 5. In the image shown in FIG. 3, only an image portion of the mountains is in an in-focus state. Therefore, in the case of the image shown in FIG. 3, a relatively large high-frequency component data are generated from the regions corresponding to the image portion of the mountain, while a relatively small high-frequency component data are generated from the regions corresponding to the other image portions. On the other hand, in the image shown in FIG. 4, only an image portion of the person is in an in-focus state. Therefore, in the case of the image shown in FIG. 4, a relatively large high-frequency component data are generated from the regions corresponding to the image portion of the person, while a relatively small high-frequency component data are generated from the regions corresponding to the other image portions. Further, in the image shown in FIG. 5, only an image portion of the flowers is in an in-focus state. Therefore, in the case of the image shown in FIG. 5, a relatively large high-frequency component data are generated from the regions corresponding to the image portion of the flowers, while a relatively small high-frequency component data are generated from the regions corresponding to the other image portions.

The data of these regions as well as image data are stored in the image storage portion 13, as aforementioned and, then, supplied to the arithmetic portion 13. In the arithmetic portion 13, the high-frequency component data of the regions which take the same position in the respective images are mutually compared in magnitude. For example, when the high-frequency component data of the regions corresponding to the image portion of the mountain are compared to each other, it is found that the regions in the image shown in FIG. 3 has a largest high-frequency component data in magnitude. Similarly, when the high-frequency component data of the regions corresponding to the image portion of the person are compared to each other, it is found that the regions in the image shown in FIG. 4 has a largest high-frequency component data in magnitude. Further, when the high-frequency component data of the regions corresponding to the image portion of the flowers are compared to each other, it is found that the regions in the image shown in FIG. 5 has a largest high-frequency component data in magnitude. Accordingly, a composite image from the plural images by selecting one of the regions having a largest high-frequency component data in magnitude at every position. Therefore, it is possible to obtain the composite image in which the image portion of the mountains as well as the image portion of the person and the image portion of the flowers can be substantially in an in-focus state in irrelevant to a depth of field or a kind of lens even when the objects have different distances with respect to the camera.

In the illustrated embodiment, when the high-frequency component data of the selected regions are connected to each other to form the composite image, interpolation of the image data are performed at boundaries of the respective adjacent regions of the composite image. Therefore, the composite image can be obtained in the state that respective adjacent portions of the image are smoothly connected to each other.

The the image data of the regions of the composite image is then supplied to the display portion 14 to display the composite image in visible. The image data of the regions of the composite image may be also recorded in a image recording medium (not shown) such as magnetic tape, disc, or card etc.

On the other hand, when data of a single image only are stored in the image storage portion, the arithmetic portion 13 causes the image data of the regions of the image to be fed from the storage portion 12 to the display portion 14 for the visual display of the image while maintaining the image data as they are.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. An electronic pan-focusing apparatus for a camera having a photographic lens, comprising:

image pickup means arranged to receive one or plural optical images from the lens, the image pickup means being adapted to divide each of the images into a plurality of regions in horizontal and vertical directions and to pickup image data and high-frequency component data from each of the regions;

image storage means for storing the image data and the high-frequency component data of each of the regions fed from the pickup means at every image; and arithmetic means adapted, when the data of the plural images are stored in the image storage means, to mutually compare in magnitude the high-frequency data of the regions which take the same position in the respective images and thereby to make a composite image from the plural images by selecting one of the regions having a largest high-frequency component data in magnitude at every position, the arithmetic means being also adapted to output the image data of the regions of the composite image.

2. The apparatus of claim 1, wherein the arithmetic means is further adapted to perform interpolation of the image data at boundaries of the respective adjacent regions of the composite image.

3. The apparatus of claim 1, wherein the arithmetic means is further adapted, when data of a single image only are stored in the storage means, to pickup the image data of the regions of the image from the storage means for outputting the same.

4. The apparatus of claim 1, wherein the image data may be fed from the arithmetic means to a display means of the camera.

5. The apparatus of claim 1, wherein the camera is one of an optical camera, a video camera, and a still video camera.

* * * * *